United States Patent Office 3,093,658
Patented June 11, 1963

3,093,658
17α,21-DIHYDROXY-2-OXAPREGNANE-3,11,20-TRIONE, ESTERS THEREOF AND INTERMEDIATES THERETO
Raphael Pappo, Skokie, Ill., assignor to G. D. Searle & Co., Chicago, Ill., a corporation of Delaware
No Drawing. Filed Oct. 16, 1961, Ser. No. 145,448
3 Claims. (Cl. 260—343.2)

The present invention relates to novel 2-oxasteroids of the pregnane series and, more particularly, to 17α,21-dihydroxy-2-oxapregnane-3,11,20-trione and esters thereof, which are represented by the structural formula

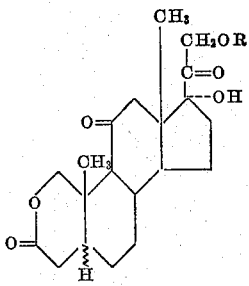

wherein R can be hydrogen or a lower alkanoyl radical, and the wavy line indicates the alternative 5α or 5β configuration.

The lower alkanoyl radicals represented by R are exemplified by formyl, acetyl, propionyl, butyryl, valeryl, caproyl, and the branched-chain isomers thereof.

The compounds of this invention can be manufactured by utilizing as the starting material 17,20;20,21-bismethylenedioxypregna-1,4-diene-3,11-dione, prepared according to the procedure described by R. E. Beyler et al., J.A.C.S., 80, 1517 (1958). Treatment of that substance with an hydroxylating medium such as potassium chlorate and osmium tetroxide results in a mixture of 4,5-dihydroxy-17,20;20,21 - bismethylenedioxypregn - 1-ene-3,11-dione and 1,2-dihydroxy-17,20;20,21-bismethylenedioxypregn-4-ene-3,11-dione, which can be separated by fractional crystallization. Cleavage of the latter 1,2-diol, suitably with lead tetraacetate in aqueous acetic acid affords 17,20;20,21 - bismethylenedioxy-1,11-dioxo-1,2-seco-A-norpregn-3-en-2-oic acid. Although the name of the latter compound indicates the open-chain aldehydo-acid structure, it will be apparent to those skilled in the art that this substance actually exists as an equilibrium mixture containing also the lactol form, as is represented below:

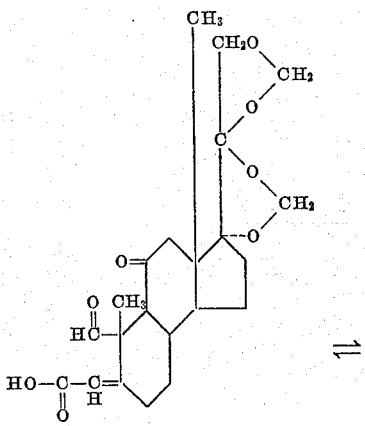

⇌

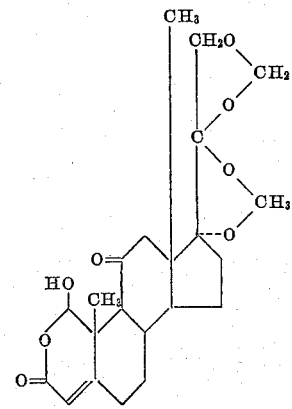

Reaction of this substance with a suitable reducing agent such as sodium borohydride in aqueous methanol yields 11β - hydroxy-17,20;20,21-bismethylenedioxy-2-oxapregn-4-en-3-one. Oxidation of the 11β-hydroxy group of the latter compound, for example by means of chromic acid in acetone, results in 17,20;20,21-bismethylenedioxy-2-oxapregn-4-ene-3,11-dione. The bismethylenedioxy group of the latter compound is removed by heating with aqueous formic acid to yield 17α,21-dihydroxy-2-oxapregn-4-ene-3,11,20-trione. Catalytic hydrogenation of this trione in the presence of a suitable catalyst such as palladium produces the 5α and 5β isomers of 17α,21-dihydroxy-2-oxapregnane-3,11,20-trione. Alternatively, these epimers are obtained by treating 17,20;20,21-bismethylenedioxy-1,11-dioxo-1,2-seco-A-norpregn-3-en-2-oic acid, with excess sodium borohydride for a period of about 16 hours, followed by regeneration of the 11-oxo group and removal of the bismethylenedioxy protecting group according to the processes hereinbefore described.

Acylation of the instant 17α,21-diols under relatively mild conditions yields the corresponding 21- alkanoates. Typically, 17α,21 - dihydroxy-2-oxa-5α-pregnane-3,11,20-trione is treated with acetic anhydride in pyridine at room temperature to afford 21-acetoxy-17α-hydroxy-2-oxa-5α-pregnane-3,11,20-trione.

The compounds of this invention display valuable pharmacological properties. They are, for example, hormonal agents as is evidenced by their ability to inhibit the various phases characteristic of inflammatory states. The instant intermediate, 17α,21-dihydroxy-2-oxapregn-4-ene-3,11,20-trione, also possesses anti-inflammatory properties.

The following examples are given by way of illustration only and are not to be construed as limiting the invention either in spirit or in scope. Temperatures are given in degrees centigrade (° C.) and quantities of materials in parts by weight unless otherwise noted.

Example 1

To a mixture of 32.6 parts of 17,20;20,21-bismethylenedioxypregna-1,4-diene-3,11-dione, 312 parts of tertiary-butyl alcohol and 400 parts of water is added 4.2 parts of potassium chlorate and 2.1 parts of osmium tetroxide, and this reaction mixture is allowed to stand at room temperatures for about 2 weeks. The solution which forms is concentrated by distilaltion at reduced pressure. An additional quantity of 300 parts by volume of a 1:1 mixture of tertiary-butyl alcohol and water is then added, and the resulting mixture is distilled again in order to remove the last traces of osmium tetroxide. Upon standing, a crystalline product separates from the mixture, and this material is collected by filtration, then extracted with boiling benzene. The insoluble fraction is collected by filtration and dried to yield 4,5-dihydroxy-17,20;20,21-bismethylenedioxypregn-1-ene-3,11-dione, which melts at about 258–263°. The benzene extract is concentrated to produce 1,2 - dihydroxy-17,20;20,21-bismethylenedioxypregn-4-ene-3,11-dione, M.P. about 233–240°.

Example 2

A mixture of 12 parts of 1,2-dihydroxy-17,20;20,21-bismethylenedioxypregn-4-ene-3,11-dione, 126 parts of acetic acid, 18 parts of water, and 37.2 parts of lead tetraacetate is warmed carefully to about 40°, whereupon an exothermic reaction accompanied by evolution of carbon dioxide, occurs. This mixture is cooled externally by means of an ice bath in order to keep the temperature below 70° and, after the exothermic reaction has subsided, is heated at 50–60° for about 1½ hours longer. This solution is then extracted with chloroform, and the organic layer is washed with dilute aqueous potassium carbonate. Distillation of the chloroform at reduced pressure affords a residue, which is recrystallized from benzene to produce 17,20;20,21-bismethylenedioxy-1,11-dioxo-1,2 - seco - A-norpregn-3-en-2-oic acid, M.P. about 215–226° (dec.). Further purification of this material can be effected by dissolution of the recrystallized product in chloroform followed by washing of the organic solution with dilute aqueous potassium carbonate, concentration of the washed solution to dryness, and recrystallization of the resulting residue from acetone. This purified material displays a melting point of about 224–227° (dec.).

Example 3

To a solution of 4.29 parts of 17,20;20,21-bismethylenedioxy-1,11-dioxo-1,2-seco-A-norpregn-3-en-2-oic acid in 50 parts of water containing 0.49 part of sodium hydroxide is added, with stirring at about 20°, 4.3 parts of sodium borohydride and 32 parts of methanol. Stirring is continued at room temperature for about 30 minutes, at the end of which time an additional 48 parts of methanol is added to dissolve the precipitate which forms. This homogeneous mixture is allowed to stand at room temperature for 3 hours longer, then is cooled by means of an ice bath, acidified, and concentrated at room temperature under reduced pressure. The resulting residue is extracted with chloroform, and the organic layer is separated, washed with cold aqueous sodium hydroxide and water, dried over anhydrous sodium sulfate, and stripped of solvent at reduced pressure. Crystallization of this residue first from benzene, then from acetone results in 11-hydroxy-17,20;20,21-bismethylenedioxy-2-oxapregn-4-en-3-one, M.P. about 230–247°. This isomeric mixture is adsorbed on silica gel, and the chromatographic column is eluted with benzene solutions containing increasing proportions of ethyl acetate and finally with pure ethyl acetate to afford 11β-hydroxy-17,20;20,21-bismethylenedioxy-2-oxapregn-4-en-3-one and 11α-hydroxy-17,20;20,21-bismethylenedioxy-2-oxapregn-4-en-3-one.

Example 4

To a solution of 4 parts of 11β-hydroxy-17,20;20,21-bismethylenedioxy-2-oxapregn-4-en-3-one in 160 parts of acetone is added 2.5 parts by volume of an aqueous solution, 8 N in chromium trioxide and 8 N in sulfuric acid. The reaction mixture is kept at room temperature for about 5 minutes, then is treated with a small quantity of isopropyl alcohol in order to destroy any excess reagent. Concentration of this mixture at room temperature under nitrogen affords a residue, which is extracted with chloroform. The organic extract is washed successively with aqueous sodium hydroxide and water, dried over anhydrous sodium sulfate, and concentrated to dryness. Crystallization of this residue from benzene affords pure 17,20;20,21-bismethylenedioxy-2-oxapregn-4-ene - 3,11 - dione, which melts at about 275–277°.

Example 5

A mixture of 5 parts of 17,20;20,21-bismethylenedioxy-2-oxapregn-4-ene-3,11-dione and 222 parts of 50% aqueous formic acid is heated on the steam bath under a stream of nitrogen for about 2 hours. The reaction mixture is then cooled and extracted with chloroform. The chloroform layer is washed successively with dilute aqueous sodium hydroxide and water, dried over anhydrous sodium sulfate, and stripped of solvent at reduced pressure to afford a gummy residue. Trituration of this residue with benzene results in 17α,21-dihydroxy-2-oxapregn-4-ene-3,11,20-trione, M.P. about 205–212° (dec.). It is represented by the structural formula

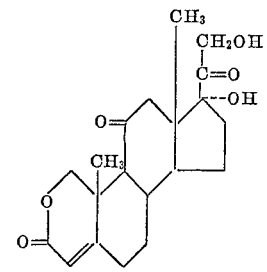

Example 6

A solution of one part of 17α,21-dihydroxy-2-oxapregn-4-ene-3,11,20-trione in 79 parts of ethanol is shaken with 0.2 part of 10% palladium-on-carbon catalyst under hydrogen at atmospheric pressure until the theoretical quantity of gas is absorbed. The catalyst is removed by filtration, and the filtrate is evaporated to dryness under nitrogen. The resulting residue is adsorbed on silica gel. Successive elutions of the chromatographic column with 50% ethyl acetate in benzene afford 17α,21-dihydroxy-2-oxa-5β-pregnane-3,11,20-trione which is represented by the structural formula

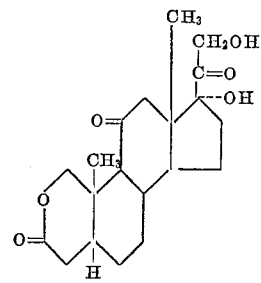

and 17α,21 - dihydroxy - 2 - oxa - 5α - pregnane - 3,11,20-trione, which is represented by the structural formula

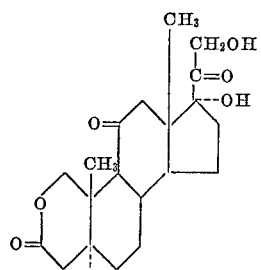

Example 7

A mixture of one part of 17α,21-dihydroxy-2-oxa-5α-pregnane-3,11,20-trione, 10 parts of acetic anhydride, and 20 parts of pyridine is allowed to stand at room temperature for about 16 hours, then is diluted with water. The resulting aqueous mixture is extracted with ether, and the organic layer is washed successively with water and dilute hydrochloric acid, dried over anhydrous sodium sulfate, and evaporated to dryness to produce 21-acetoxy- 17α - hydroxy - 2 - oxa - 5α - pregnane - 3,11,20 - trione of the structural formula

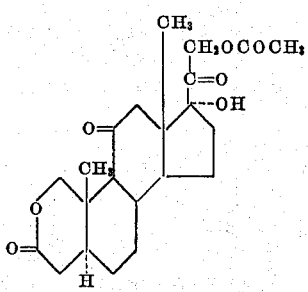

The substitution of an equivalent quantity of 17α,21-dihydroxy-2-oxa-5β-pregnane-3,11,20-trione in the procedure of this example results in 21-acetoxy-17α-hydroxy-2-oxa-5β-pregnane-3,11,20-trione of the structural formula

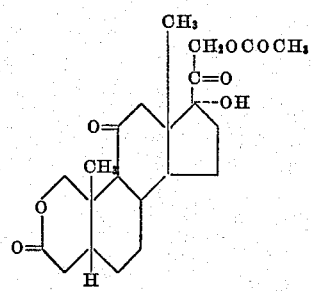

Example 8

By substituting 13 parts of propionic anhydride and otherwise proceeding according to the processes of Example 7, 17α-hydroxy-21-propionoxy-2-oxa-5α-pregnane-3,11,20-trione and 17α-hydroxy-21-propionoxy-2-oxa-5β-pregnane-3,11,20-trione are obtained.

What is claimed is:
1. A compound of the formula

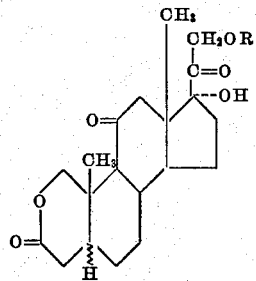

wherein R is selected from the group consisting of hydrogen and lower alkanoyl radicals.
2. 17α,21-dihydroxy-2-oxapregnane-3,11,20-trione.
3. 21 - acetoxy - 17α - hydroxy - 2 - oxapregnane - 3,11,20-trione.

No references cited.